United States Patent
Schmalenberg (10) Patent No.: US 11,378,658 B2
(45) Date of Patent: Jul. 5, 2022

(54) SYSTEMS AND METHODS FOR INCREASING THE DYNAMIC RANGE OF A LIDAR SENSOR

(71) Applicant: Toyota Motor Engineering & Manufacturing North America, Inc., Plano, TX (US)

(72) Inventor: Paul Donald Schmalenberg, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 720 days.

(21) Appl. No.: 16/262,288

(22) Filed: Jan. 30, 2019

(65) Prior Publication Data

US 2020/0241115 A1 Jul. 30, 2020

(51) Int. Cl.
*G01S 17/32* (2020.01)
*G01S 7/481* (2006.01)
*G01S 17/931* (2020.01)

(52) U.S. Cl.
CPC ......... *G01S 7/4816* (2013.01); *G01S 17/32* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 5,164,784 A | * | 11/1992 | Waggoner ............... G01P 5/26 356/28 |
| 2014/0293263 A1 | | 10/2014 | Justice et al. |
| 2015/0192676 A1 | | 7/2015 | Kotelnikov et al. |
| 2016/0259038 A1 | | 9/2016 | Retterath et al. |
| 2018/0234229 A1 | | 8/2018 | Somichetty et al. |
| 2018/0299552 A1 | | 10/2018 | Shu et al. |

* cited by examiner

*Primary Examiner* — Hovhannes Baghdasaryan
(74) *Attorney, Agent, or Firm* — Christopher G. Darrow; Darrow Mustafa PC (57) ABSTRACT

In one embodiment, a waveguide is added to the LiDAR sensor that redirects some of a received target return laser beam to a first stage photodetector and amplifier. When the amplitude of the target return laser beam is high enough to oversaturate the amplifier, an electric current is generated by the amplifier and received by a tunable coupler. As the tunable coupler heats up due to the electric current, it redirects energy from the return target laser beam to a beam dump. The reduced return target laser beam is then received by a photodetector or RF amplifier and is used to calculate the distance between the LiDAR sensor and object that reflected the received target return laser beam. In addition, rather than redirect the energy to a beam dump, the energy may be redirected to another photodetector or amplifier and may be used to supplement the distance calculation.

20 Claims, 4 Drawing Sheets

SYSTEMS AND METHODS FOR INCREASING THE DYNAMIC RANGE OF A LIDAR SENSOR

TECHNICAL FIELD

The subject matter described herein relates, in general, to systems and methods for increasing the dynamic range of LiDAR sensors, and, in particular, to preventing the oversaturation of an amplifier to allow for the usage of high-power reference lasers at close distances.

BACKGROUND

A frequency-modulated continuous wave (FMCW) LiDAR is the most precise type of LiDAR sensor currently available. Generally such LiDAR sensors work by comparing a frequency of a reference laser beam with a frequency of a return laser beam. The comparison is used to determine a distance between the LiDAR sensor and an object that reflected the return laser beam.

While such FMCW LiDAR sensors are very precise, the use of a high-power (amplitude) reference laser and the associated high-power return laser beam can make the FMCW LiDAR susceptible to frequency clipping. For example, a high-power return laser beam from a close object can oversaturate a photodetector or RF amplifier, which may result in frequency clipping. Such clipping may lead to inaccurate or unreliable performance of the LiDAR sensor at close distances.

SUMMARY

In one embodiment, a waveguide is added to the LiDAR sensor that redirects some of a received target return laser beam to a first stage photodetector and amplifier. When the amplitude of the target return laser beam is high enough to oversaturate the amplifier, an electric current is generated by the amplifier and received by a tunable coupler. As the tunable coupler heats up due to the electric current, it redirects energy from the return target laser beam to a beam dump. The reduced return target laser beam is then received by a photodetector or RF amplifier and is used to determine the distance between the LiDAR sensor and an object that reflected the received target return laser beam. In addition, rather than redirect the energy to a beam dump, the energy may be redirected to another photodetector or amplifier and may be used to supplement the distance calculation.

In one embodiment, a system for increasing the dynamic range of a LiDAR sensor is provided. The system includes a first photodetector and a receiving module that receives a target return laser beam and a reference laser beam; and combines some or all of the target return laser beam and the reference laser beam to create a combined laser beam. The system further includes a detection module that: receives some or all of the target return laser beam from the receiving module; and when an amplitude of the target return laser beam satisfies a threshold, generates an electric current. The system further includes an attenuator module that: when the electric current is received from the detection module, reduces the amplitude of the combined laser beam by an accumulation waveguide and sends the reduced amplitude combined laser beam to the first photodetector; and when the electric current is not received from the detection module, sends the combined laser beam to the first photodetector.

In one embodiment, a method for increasing the dynamic range of a LiDAR sensor is provided. The method includes: receiving a target return laser beam and a reference laser beam; combining some or all of the target return laser beam and the reference laser beam to create a combined beam; determining if an amplitude of the target return laser beam satisfies a threshold; if the amplitude of the target return laser beam satisfies the threshold, generating an electric current; and in response to the generated electric current: reducing the amplitude of the combined laser beam; and sending the reduced amplitude combined laser beam to a first photodetector.

In one embodiment, a system for increasing the dynamic range of a LiDAR sensor is provided. The system includes: a photodetector; a target return laser waveguide that receives a target return laser beam; a reference return laser waveguide that receives a reference laser beam; a combiner that combines some or all of the target return laser beam and the reference laser beam to create a combined laser beam; an amplifier that, when an amplitude of the target return laser beam satisfies a threshold, generates an electric current; and an accumulation wave guide or a tunable coupler that: when the electric current is received from the amplifier, reduces the amplitude of the combined laser beam and sends the reduced amplitude combined laser beam to the photodetector; and when the electric current is not received from the amplifier, sends the combined laser beam to the photodetector.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving the dynamic range of LiDAR sensors are disclosed. Vehicles such as the autonomous vehicle 100 of FIG. 1 may use FMCW LiDAR sensors to perform various operations such as object detection and range finding. However, as described above, current FMCW LiDAR sensors are susceptible to clipping due to the high-powered laser typically used.

Figure 2:
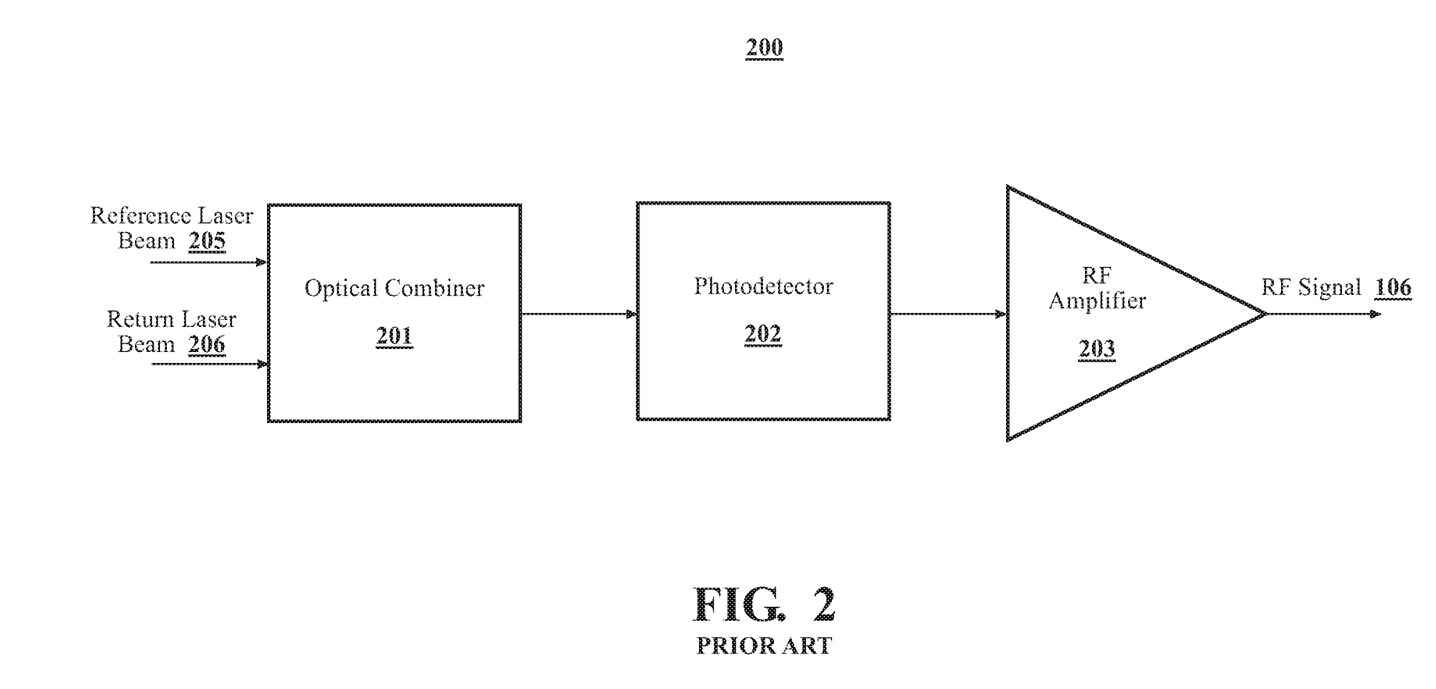
FIG. 2 illustrates a prior art partial LiDAR sensor system.

For example, FIG. 2 is an illustration of a current FMCW LiDAR sensor 200. An optical combiner 201 receives both a reference laser beam 205 and a return laser beam 206. The reference laser beam 205 has a frequency $f_1$ and the return laser beam 206 has a frequency $f_2$. The reference laser beam 205 is the laser beam 205 that is currently output by the LiDAR sensor 200. The return laser beam 206 is a laser beam that was previously output by the LiDAR sensor 200 and has been reflected back to the LiDAR sensor 200 from an object.

The optical combiner 201 combines the reference laser beam 205 and the return laser beam 206 to generate a combined laser beam. The combined laser beam has a modulation frequency $f_{rf}$ that is equal to $f_1$-$f_2$. The combined laser beam is provided by the optical combiner 201 to a photodetector 202, which then provides an RF signal 106 to an RF amplifier 203. The value of $f_1$-$f_2$ may then be used by the LiDAR sensor 200, or another computing device, to calculate the distance between the LiDAR sensor 200 and the object that reflected the return laser beam 206. The distance may be used by one or more autonomous vehicle components of the vehicle 100, for example.

As noted above, when the object is close to the LiDAR sensor 200, the energy or amplitude of the return laser beam 206 may be high, which may oversaturate the RF amplifier 203. This may result in clipping, which may make the distance calculation with respect to the object inaccurate or unreliable.

One solution to the problem is to use a lower powered laser beam in the LiDAR sensor 200. However, this results in a lower detection range for the LiDAR sensor 200. Another solution is to dynamically configure the RF amplifier when clipping is detected. However, this solution requires that some clipping be detected before the RF amplifier can be configured. This initial clipping is still lost information that effects the performance of the LiDAR sensor.

Returning to FIG. 1, the vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Figure 1:
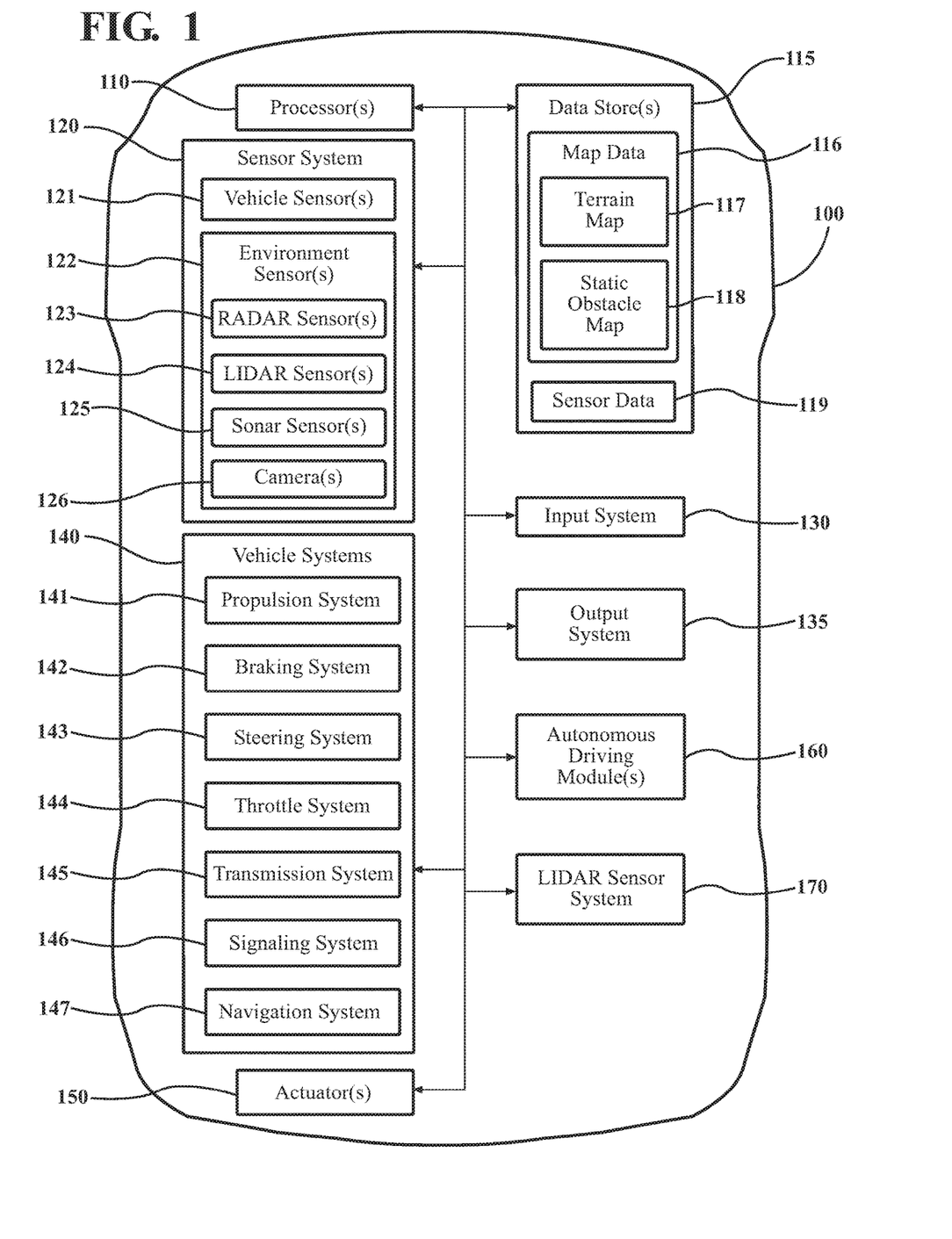
FIG. 1 illustrates an example of an autonomous vehicle.

Some of the possible elements of the vehicle 100 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a LiDAR sensor system 170 that is implemented to perform methods and other functions as disclosed herein relating to eliminating RF amplifier oversaturation to increase the dynamic range of the LiDAR sensor. The noted functions and methods will become more apparent with a further discussion of the figures. Note the LiDAR system 170 described herein may supplement or replace the LiDAR sensors 124 described later with respect to FIG. 1.

Figure 3:
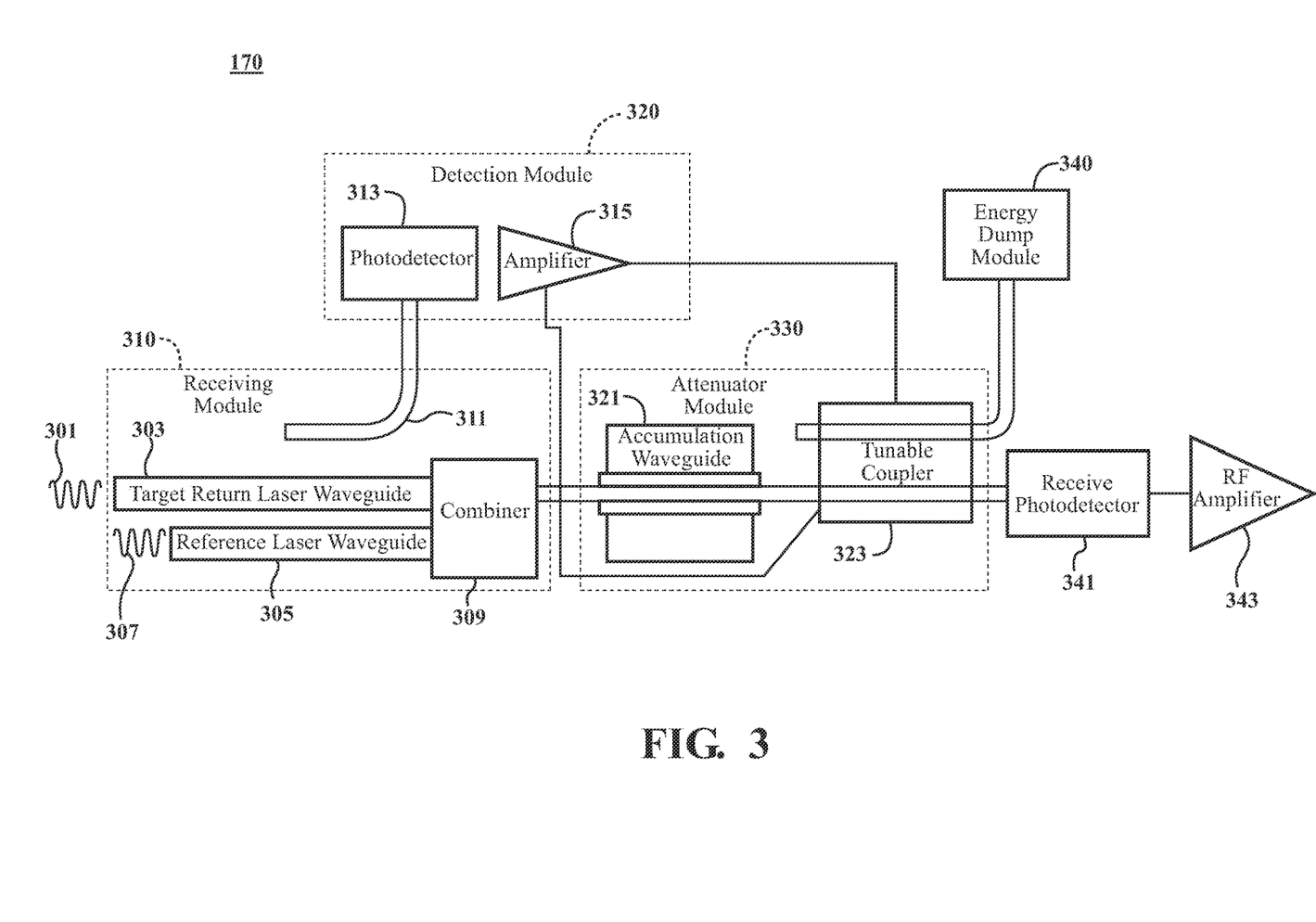
FIG. 3 illustrates an embodiment of a partial LiDAR sensor system.

With reference to FIG. 3, one embodiment of the LiDAR sensor system 170 of FIG. 1 is further illustrated. As illustrated, the sensor system 170 includes several components or modules such as a receiving module 310, a detection module 320, an attenuator module 330, and an energy dump module 340. More or fewer modules may be supported by the LiDAR sensor system 170. Depending on the embodiment, the LiDAR sensor system 170 may be implemented using a single system on a chip ("SoC"). Other implementations may be supported. The LiDAR sensor system 170 may provide output to one or more autonomous vehicle systems of the vehicle 100.

The receiving module 310 may receive a target return laser beam 301 and a reference laser beam 307. The target return laser beam 301 may be an earlier version of the reference laser beam 307 after having been reflected off of an object within range of the LiDAR sensor system 170. The target return laser beam 301 may be received by a target return laser waveguide 303. The reference laser beam 307 may be received by a reference laser waveguide 305. Any type of waveguide may be used.

The receiving module 310 may further include a coupler 311. The coupler 311 may receive at least some of the target return laser beam 301. The coupler 311 may provide at least some of the target laser return beam 301 to the detection module 320. Any type of coupler may be used.

The receiving module 310 may further combine the target return laser beam 301 and the reference laser beam 307 using a combiner 309. The combiner 309 may then provide the combined beam to the attenuator module 330. Any type of combiner may be used.

The detection module 320 may receive the target return laser beam 301 from the coupler 311, and may determine whether the energy or amplitude of the target return laser beam 301 is high enough to saturate the RF amplifier 343. In response to the determination, the detection module 330 may generate an electric current. Else, the detection module 320 may not generate the electric current. The generated electric current may be received by the attenuator module 330.

In one embodiment, the detection module 320 may include a photodetector 313 and an amplifier 315. The photodetector 313 may receive the target return laser beam 301 and may provide the beam 301 to the amplifier 315. The amplifier 315 may generate electrical current when the amplitude of the beam is high enough to oversaturate the RF amplifier 343. Accordingly, the amplifier 315 may be selected or configured based on the capabilities of the RF amplifier 343. Any type of photodetector 313 and amplifier 315 may be used.

The attenuator module 330 may receive the combined laser beam from the receiving module 310. When no electrical current is received from the detection module 320, the attenuator module 330 may provide the combined laser beam to the receive photodetector 341 and the RF amplifier 343. Because it is known that the target return laser 301 did not exceed the capabilities of the RF amplifier 343, the RF amplifier 343 may receive the unchanged combined beam from the attenuator module 330. The combined beam may then be used to determine the distance between the object that reflected the target return laser 301. Any method may be used to calculate the distance.

When an electrical signal is received from the detection module 320, the attenuator module 330 may reduce the amplitude of the combined beam. In some embodiments, the attenuator module 330 may reduce the amplitude by redirecting some energy of the beam into the energy dump module 340.

The attenuator module 330 may include an accumulation waveguide 321 and/or a tunable coupler 323. The accumulation waveguide 321 may function as a p-n junction charge accumulator and may be used for fine-tuning the amount of energy that is redirected to the energy dump module 340. When the electrical current is applied to electrodes surrounding the accumulation waveguide 321, charge may begin to accumulate making the accumulation waveguide 321 lossy by design.

The tunable coupler 323 may provide coarse-tuning and may include a resistive element that heats the accumulation waveguide 321, which when heated, may direct more energy to the energy dump module 340 and less to the receive photodetector 341. Depending on the embodiment, the tunable coupler 323 may further include a tunable material such as monolayer or Van der Waals materials.

The energy dump module 340 may receive excess beam energy from the attenuator module 330. In one embodiment, the energy dump module 340 may be a non-reflective beam dump. Other types of dumps may be used.

In other embodiments, the energy dump module 340 may include another photodetector and/or RF amplifier. The photodetector and RF amplifier may generate a signal from the received excess energy. The signal may indicate the amount of excess energy that was taken from the combined beam and may be used to help calculate the distance from the LiDAR sensor system 170 and the object that reflected the target return laser beam 301. For example, knowing the amount of energy that was removed from the combined beam may help refine the distance calculation.

The receive photodetector 341 and the RF amplifier 343 may receive the combined beam and may generate a signal that may be used to calculate the distance from the LiDAR sensor system 170 to the object that reflected the target return laser beam 301. The RF amplifier 343 and the amplifier 315 of the detection module 320 may be matched so that current is generated in the correct proportion by the amplifier 315 to the attenuator module 330 to prevent oversaturation of the RF amplifier 343.

Figure 4:
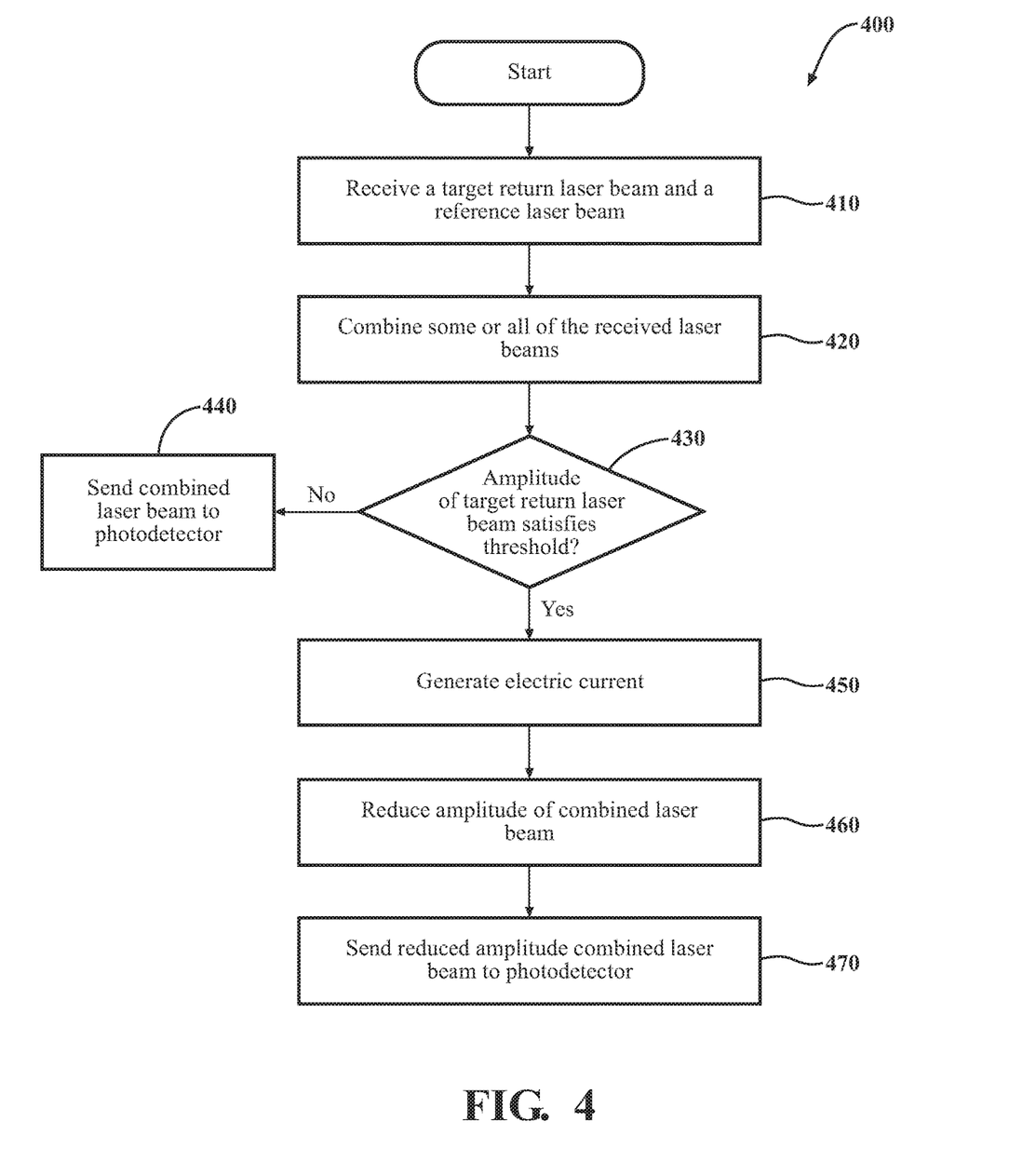
FIG. 4 illustrates a flowchart of a method that is associated with reducing the energy of a combined laser beam to prevent the oversaturation of an amplifier and therefore increase the dynamic range of a LiDAR sensor.

Additional aspects of increasing the dynamic range of a LiDAR sensor will be discussed in relation to FIG. 4. FIG. 4 illustrates a flowchart of a method 400 that is associated with reducing the energy of a combined laser beam to prevent the oversaturation of an amplifier and therefore increasing the dynamic range of a LiDAR sensor. The method 400 will be discussed from the perspective of the LiDAR sensor system 170 of FIG. 3. While the method 400 is discussed in combination with the LiDAR sensor system 170, it should be appreciated that the method 400 is not limited to being implemented within the LiDAR sensor system 170 but is instead one example of a system that may implement the method 400.

At 410, the receiving module 310 receives a target return laser beam 301 and a reference laser beam 307. The receiving module 310 may include a target return laser waveguide 303 and a reference laser waveguide 305 that each receive their respective laser beams. The target return laser beam 301 may be reflected off of an object at a distance from the LiDAR sensor system 170. The receiving module 310 also includes a coupler 311 that provides some of the target return laser beam 301 to the detection module 320.

At 420, the receiving module 310 combines some or all of the target return laser beam 301 and reference laser beam 307 to generate a combined laser beam. The receiving module 310 may provide the combined laser beam to the attenuator module 330.

At 430, the detection module 320 determines whether the amplitude of the target return laser beam 301 satisfies a threshold. Depending on the embodiment, the threshold may be satisfied when the amplitude of the target return laser beam 301 would oversaturate the RF amplifier 343. The detection module 320 may include a photodetector 313 and an amplifier 315. The amplifier 315 may be matched to the RF amplifier 343.

If the threshold is satisfied, the method 400 may continue at 440. Else, the method 400 may continue at 450.

At 440, the attenuator module 330 may send the combined laser beam to the photodetector 341. Because the threshold was not satisfied, the combined beam is unlikely to oversaturate the RF amplifier 343. The combined laser beam may then be used to determine the distance between the LiDAR sensor system 170 and the object. The determined distance may then be used by the vehicle 100 to provide one or more functions such as range finding and object detection/avoidance.

At 450, the detection module 320 may generate electric current. The amplifier 315 may generate the electric current when the amplitude of the target return laser beam 301 is likely to oversaturate the RF amplifier 343. The generated electric current may be provided by the detection module 320 to the attenuator module 330.

At 460, the attenuator module 330 may reduce the amplitude of the combined laser beam. Depending on the embodiment, the attenuator module 330 may reduce the amplitude in response to receiving the electric current. For example, the attenuator module 330 may include one or both of an accumulation waveguide 321 and a tunable coupler 323 that heats the accumulation waveguide 321 causing energy of the combined laser beam to be redirected to an energy dump module 340.

At 470, the attenuator module 330 may send the reduced combined laser beam to the photodetector 341. Because the amplitude of the combined beam was reduced, the combined beam is no longer likely to oversaturate the RF amplifier 343. The reduced combined laser beam may then be used to determine the distance between the LiDAR sensor system 170 and the object. The determined distance may then be used by the vehicle 100 to provide one or more functions such as range finding and object detection/avoidance.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the LiDAR sensor system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the LiDAR sensor system 170, and/or the autonomous driving module(s) 160 may control some or all of these vehicle systems 140 and, thus, may be partially or fully autonomous.

The processor(s) 110, the LiDAR sensor system 170, and/or the autonomous driving module(s) 160 can be operatively connected to communicate with the various vehicle systems 140 and/or individual components thereof. For example, returning to FIG. 1, the processor(s) 110, the LiDAR sensor system 170, and/or the autonomous driving module(s) 160 can be in communication to send and/or receive information from the various vehicle systems 140 to control the movement, speed, maneuvering, heading, direction, etc. of the vehicle 100. The processor(s) 110, the LiDAR sensor system 170, and/or the autonomous driving module(s) 160 may control some or all of these vehicle systems 140.

The processor(s) 110, the LiDAR sensor system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the LiDAR sensor system 170, and/or the autonomous driving module(s) 160 can control the direction and/or speed of the vehicle 100. The processor(s) 110, the LiDAR sensor system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the LiDAR sensor system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

What is claimed is:

1. A system for increasing a dynamic range of a LiDAR sensor, the system comprising:
    a first photodetector;
    a receiving module configured to:
        receive a target return laser beam and a reference laser beam; and
        combine a first portion of the target return laser beam and the reference laser beam to create a combined laser beam;
    a detection module configured to:
        receive a second portion of the target return laser beam from the receiving module; and
        generate, when an amplitude of the target return laser beam satisfies a threshold, an electric current;
    an attenuator module configured to:
        reduce, when the electric current is received from the detection module, the amplitude of the combined laser beam and sends a reduced amplitude combined laser beam to the first photodetector; and
        send, when the electric current is not received from the detection module, the combined laser beam to the first photodetector.

2. The system of claim 1, wherein the receiving module comprises one or more of a target return laser waveguide, a reference laser waveguide, or a combiner.

3. The system of claim 1, wherein the detection module comprises one or more of a photodetector or an RF amplifier.

4. The system of claim 1, wherein the attenuator module comprises one or more of an accumulation waveguide or a tunable coupler.

5. The system of claim 1, further comprising:
    an energy dump module configured to receive excess energy from the attenuator module, wherein the excess energy is from a reduction of the amplitude of the combined laser beam.

6. The system of claim 5, wherein the energy dump module is a non-reflective beam dump.

7. The system of claim 5, wherein the energy dump module is a second photodetector.

8. The system of claim 1, further comprising an RF amplifier configured to receive the reduced amplitude combined laser beam from the first photodetector, wherein an amplitude of the reduced amplitude combined laser beam does not oversaturate the RF amplifier.

9. The system of claim 1, further comprising an RF amplifier configured to receive the combined laser beam from the first photodetector, wherein an amplitude of the combined laser beam does not oversaturate the RF amplifier.

10. A method for increasing a dynamic range of a LiDAR sensor, the method comprising:
    receiving a target return laser beam and a reference laser beam;
    combining a first portion of the target return laser beam and the reference laser beam to create a combined beam;
    determining, from a second portion of the target return laser beam, if an amplitude of the target return laser beam satisfies a threshold;
    generating, in response to a determination that the amplitude of the target return laser beam satisfies the threshold, an electric current;
    reducing, in response to the electric current, an amplitude of the combined laser beam; and
    sending, in response to the electric current, a reduced amplitude combined laser beam to a first photodetector.

11. The method of claim 10, further comprising:
    sending, in response to a determination that the amplitude of the target return laser beam does not satisfy the threshold, the combined laser beam to the first photodetector.

12. The method of claim 10, wherein the receiving the target return laser beam and the reference laser beam comprises receiving, by one or both of a target return laser waveguide and a reference laser beam waveguide, the target return laser beam and the reference laser beam.

13. The method of claim 10, wherein the determining if the amplitude of the target return laser beam satisfies the threshold comprises determining, by one or more of a second photodetector or an RF amplifier, if the amplitude of the target return laser beam satisfies the threshold.

14. The method of claim 13, wherein the electric current is generated by the RF amplifier.

15. The method of claim 10, wherein the reducing the amplitude of the combined laser beam comprises reducing, by one or both of an accumulation waveguide and a tunable coupler, the amplitude of the combined laser beam.

16. The method of claim 10, wherein the reducing the amplitude of the combined laser beam results in excess energy, and further comprising providing the excess energy to a second photodetector.

17. The method of claim 10, wherein the reducing the amplitude of the combined laser beam results in excess energy, and further comprising providing the excess energy to a non-reflective beam dump.

18. The method of claim 10, further comprising determining that the threshold is satisfied when the amplitude of the target return laser beam will not oversaturate an RF amplifier.

19. The method of claim 10, further comprising sending the reduced amplitude combined laser beam to an RF amplifier by the first photodetector.

20. A system for increasing a dynamic range of a LiDAR sensor, the system comprising:
- a photodetector;
- a target return laser waveguide configured to receive a target return laser beam;
- a reference return laser waveguide configured to receive a reference laser beam;
- a combiner configured to combine a portion of the target return laser beam and the reference laser beam to create a combined laser beam;
- an amplifier configured to generate, when an amplitude of the target return laser beam, determined from a second portion of the target return laser beam, satisfies a threshold, an electric current; and
- an accumulation waveguide or a tunable coupler configured to:
  - reduce, when the electric current is received from the amplifier, an amplitude of the combined laser beam and send a reduced amplitude combined laser beam to the photodetector; and
  - send, when the electric current is not received from the amplifier, the combined laser beam to the photodetector.

* * * * *